(12) United States Patent
Miyaji et al.

(10) Patent No.: US 9,647,781 B2
(45) Date of Patent: May 9, 2017

(54) DATA RECEPTION DEVICE, MARKER INFORMATION EXTRACTION METHOD, AND MARKER POSITION DETECTION METHOD

(71) Applicant: FUJITSU LIMITED, Kawasaki-shi, Kanagawa (JP)

(72) Inventors: Katsutoshi Miyaji, Utsunomiya (JP); Hiroyuki Homma, Kawasaki (JP); Ken Shiine, Sano (JP); Hiromichi Makishima, Oyama (JP)

(73) Assignee: FUJITSU LIMITED, Kawasaki (JP)

( * ) Notice: Subject to any disclaimer, the term of this patent is extended or adjusted under 35 U.S.C. 154(b) by 247 days.

(21) Appl. No.: 14/056,597

(22) Filed: Oct. 17, 2013

(65) Prior Publication Data

US 2014/0044137 A1 Feb. 13, 2014

Related U.S. Application Data

(63) Continuation of application No. PCT/JP2011/059874, filed on Apr. 21, 2011.

(51) Int. Cl.
*H04J 3/06* (2006.01)
*H04L 25/14* (2006.01)
(Continued)

(52) U.S. Cl.
CPC ............. *H04J 3/06* (2013.01); *H04L 25/14* (2013.01); *H04J 3/047* (2013.01); *H04J 3/0697* (2013.01); *H04L 25/4908* (2013.01)

(58) Field of Classification Search
None
See application file for complete search history.

(56) References Cited

U.S. PATENT DOCUMENTS 5,646,966 A 7/1997 Chaki et al.
6,658,072 B1 12/2003 Asanuma
(Continued)

FOREIGN PATENT DOCUMENTS

JP 61-261973 11/1986
JP 6-20391 1/1994
(Continued)

OTHER PUBLICATIONS

JPOA—Office Action of Japanese Patent Application No. 2013-510800 dated Mar. 10, 2015, with English translation of the relevant part. All references cited in the above listed JPOA were previously submitted in the IDS filed on Oct. 17, 2013 and Sep. 10, 2014.
(Continued)

*Primary Examiner* — Hassan Phillips
*Assistant Examiner* — Omeed D Rahgozar
(74) *Attorney, Agent, or Firm* — Fujitsu Patent Center

(57) ABSTRACT

A data reception device which receives data transmitted through a plurality of transmission lines. The data reception device includes a position detection unit which corrects a skew of data transmitted respectively through the plurality of transmission lines, and detects for each lane a position of a marker for identification of a lane which is assigned the data, and an information extraction unit which extracts identification information indicated by the marker for each lane using a result of the detection of the position of the marker by the position detection unit.

4 Claims, 11 Drawing Sheets

(51) Int. Cl.
*H04J 3/04* (2006.01)
*H04L 25/49* (2006.01)

(56) References Cited

U.S. PATENT DOCUMENTS

| | | | | |
|---|---|---|---|---|
| 7,295,639 | B1* | 11/2007 | Cory | 375/371 |
| 2010/0092174 | A1 | 4/2010 | Brown et al. | |
| 2010/0229071 | A1 | 9/2010 | Ganga et al. | |

FOREIGN PATENT DOCUMENTS

| | | |
|---|---|---|
| JP | 6-28383 | 4/1994 |
| JP | 2955576 | 7/1999 |
| JP | 2000-196498 | 7/2000 |
| JP | 2010-114765 | 5/2010 |
| JP | 2010-258816 | 11/2010 |
| JP | 2010-263610 | 11/2010 |
| JP | 2011-259201 | 12/2011 |
| JP | 2012-023586 | 2/2012 |
| JP | 2012-039176 | 2/2012 |
| JP | 2012-222611 | 11/2012 |

OTHER PUBLICATIONS

EESR—Extended European Search Report dated Aug 22, 2014 issued in corresponding European Patent Application No. 11863972.3.
Mark Gustlin, 1000E and 40GE PCS and MLD Proposal, IEEE 802.3ba 40Gb/s and 100Gb/s Ethernet Task Force, Mar. 2008.
International Search Report, mailed in connection with PCT/JP2011/059874 and mailed Jul. 5, 2011.
Notification of Transmittal of Translation of the International Preliminary Report on Patentability (Form PCT/IB/338, Form PCT/IB/373 & Form PCT/ISA/237), PCT/JP2011/059874, 5 pages, dated Nov. 14, 2013. Please note all references cited herein, were previously cited in an IDS filed on Oct. 17, 2013.

\* cited by examiner

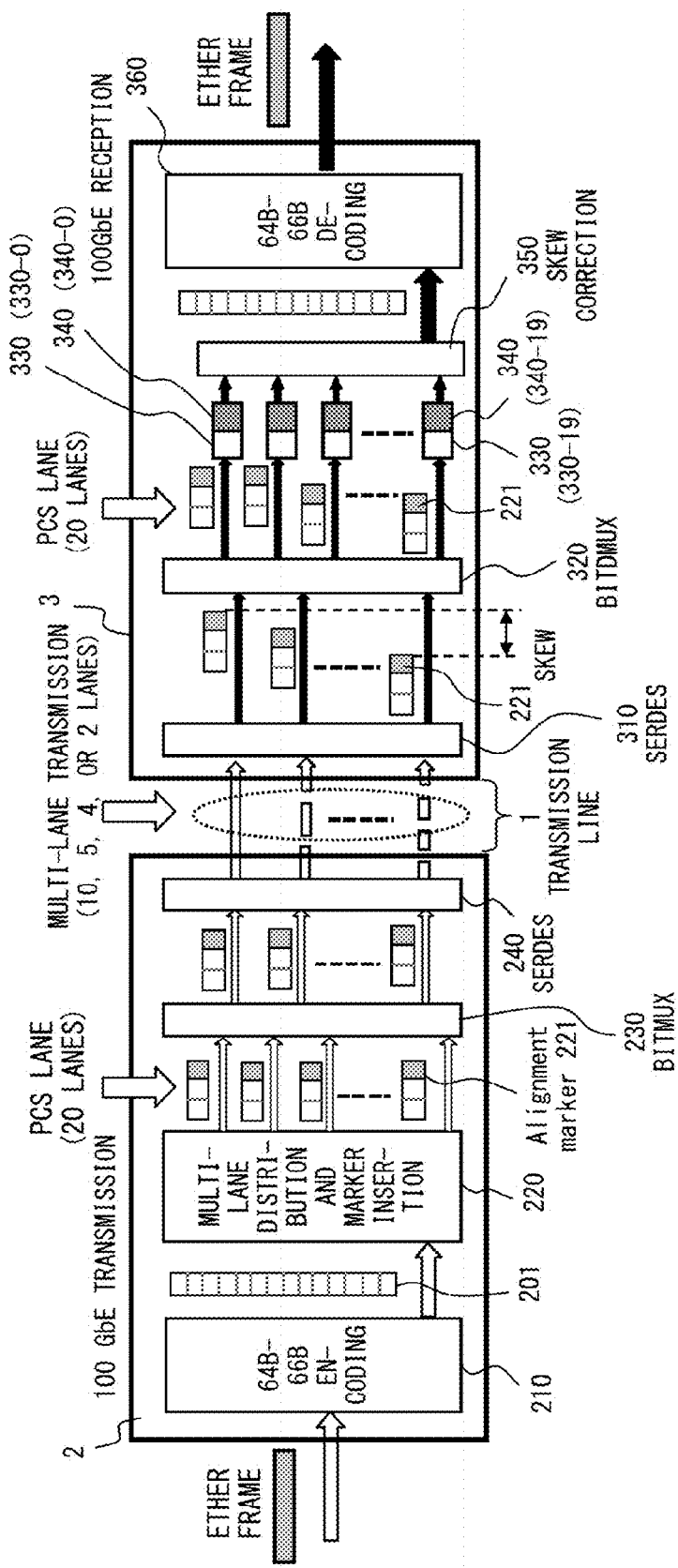
F I G. 1

FIG. 2

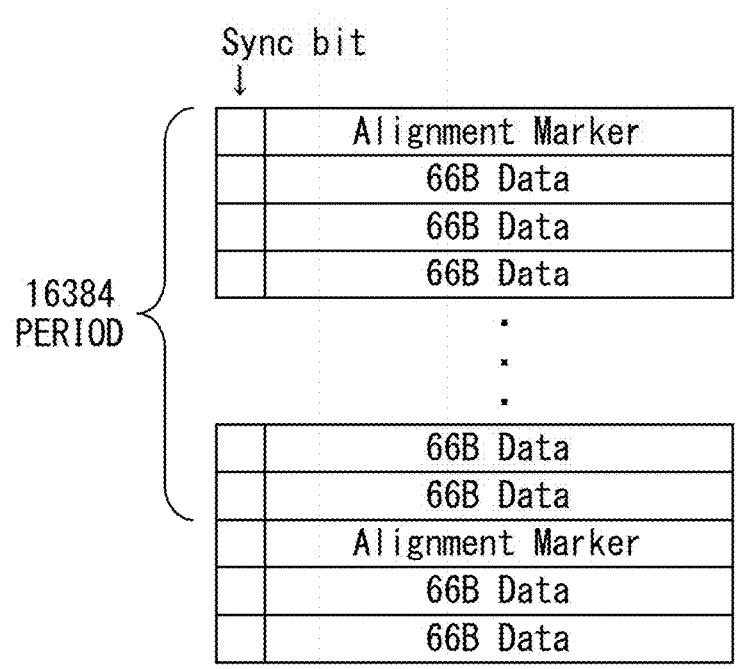
F I G. 3

| Bit Position | 0 | 1 2 | 9 10 | 17 18 | 25 26 | 33 34 | 41 42 | 49 50 | 57 58 | 65 |
|---|---|---|---|---|---|---|---|---|---|---|
| | 10 | M0 | M1 | M2 | BIP3 | M4 | M5 | M6 | BIP7 | |

FIG. 4A

| PCS Lane Number | Encoding {M0, M1, M2, BIP3, M4, M5, M6, BIP7} | PCS Lane Number | Encoding {M0, M1, M2, BIP3, M4, M5, M6, BIP7} |
|---|---|---|---|
| 0 | 0xC1, 0x68, 0x21, BIP3, 0x3E, 0x97, 0xDE, BIP7 | 10 | 0xFD, 0x6C, 0x99, BIP3, 0x02, 0x93, 0x66, BIP7 |
| 1 | 0x9D, 0x71, 0x8E, BIP3, 0x62, 0x8E, 0x71, BIP7 | 11 | 0xB9, 0x91, 0x55, BIP3, 0x46, 0x6E, 0xAA, BIP7 |
| 2 | 0x59, 0x4B, 0xE8, BIP3, 0xA6, 0xB4, 0x17, BIP7 | 12 | 0x5C, 0xB9, 0xB2, BIP3, 0xA3, 0x46, 0x4D, BIP7 |
| 3 | 0x4D, 0x95, 0x7B, BIP3, 0xB2, 0x6A, 0x84, BIP7 | 13 | 0x1A, 0xF8, 0xBD, BIP3, 0xE5, 0x07, 0x42, BIP7 |
| 4 | 0xF5, 0x07, 0x09, BIP3, 0x0A, 0xF8, 0xF6, BIP7 | 14 | 0x83, 0xC7, 0xCA, BIP3, 0x7C, 0x38, 0x35, BIP7 |
| 5 | 0xDD, 0x14, 0xC2, BIP3, 0x22, 0xEB, 0x3D, BIP7 | 15 | 0x35, 0x36, 0xCD, BIP3, 0xCA, 0xC9, 0x32, BIP7 |
| 6 | 0x9A, 0x4A, 0x26, BIP3, 0x65, 0xB5, 0xD9, BIP7 | 16 | 0xC4, 0x31, 0x4C, BIP3, 0x3B, 0xCE, 0xB3, BIP7 |
| 7 | 0x7B, 0x45, 0x66, BIP3, 0x84, 0xBA, 0x99, BIP7 | 17 | 0xAD, 0xD6, 0xB7, BIP3, 0x52, 0x29, 0x48, BIP7 |
| 8 | 0xA0, 0x24, 0x76, BIP3, 0x5F, 0xDB, 0x89, BIP7 | 18 | 0x5F, 0x66, 0x2A, BIP3, 0xA0, 0x99, 0xD5, BIP7 |
| 9 | 0x68, 0xC9, 0xFB, BIP3, 0x97, 0x36, 0x04, BIP7 | 19 | 0xC0, 0xF0, 0xE5, BIP3, 0x3F, 0x0F, 0x1A, BIP7 |

FIG. 4B

PCS Lane#0 : 10 10000011 00010110 10000100 BIP3 01111100 11101001 01111011 BIP7

FIG. 4C

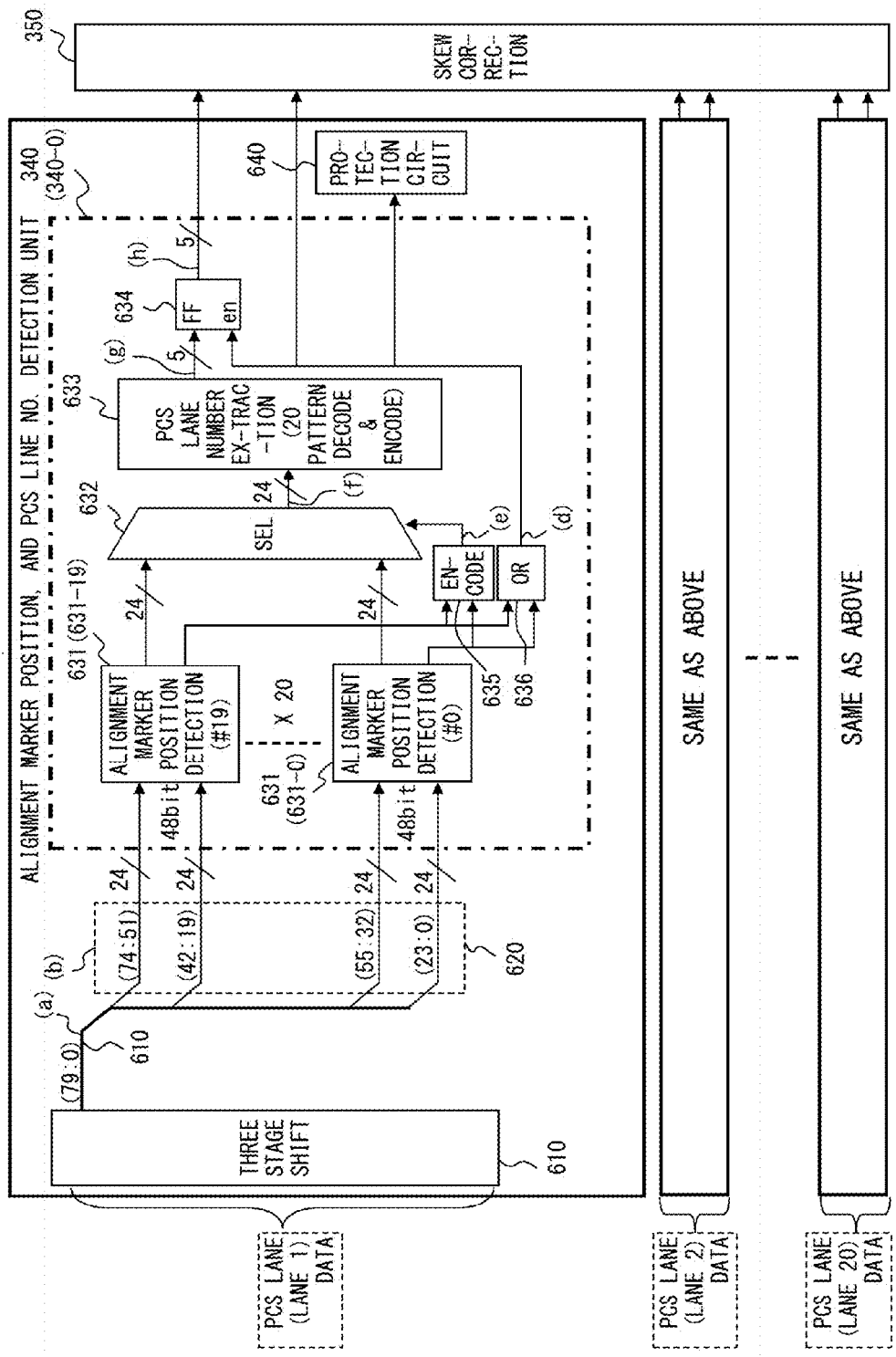
F I G. 5

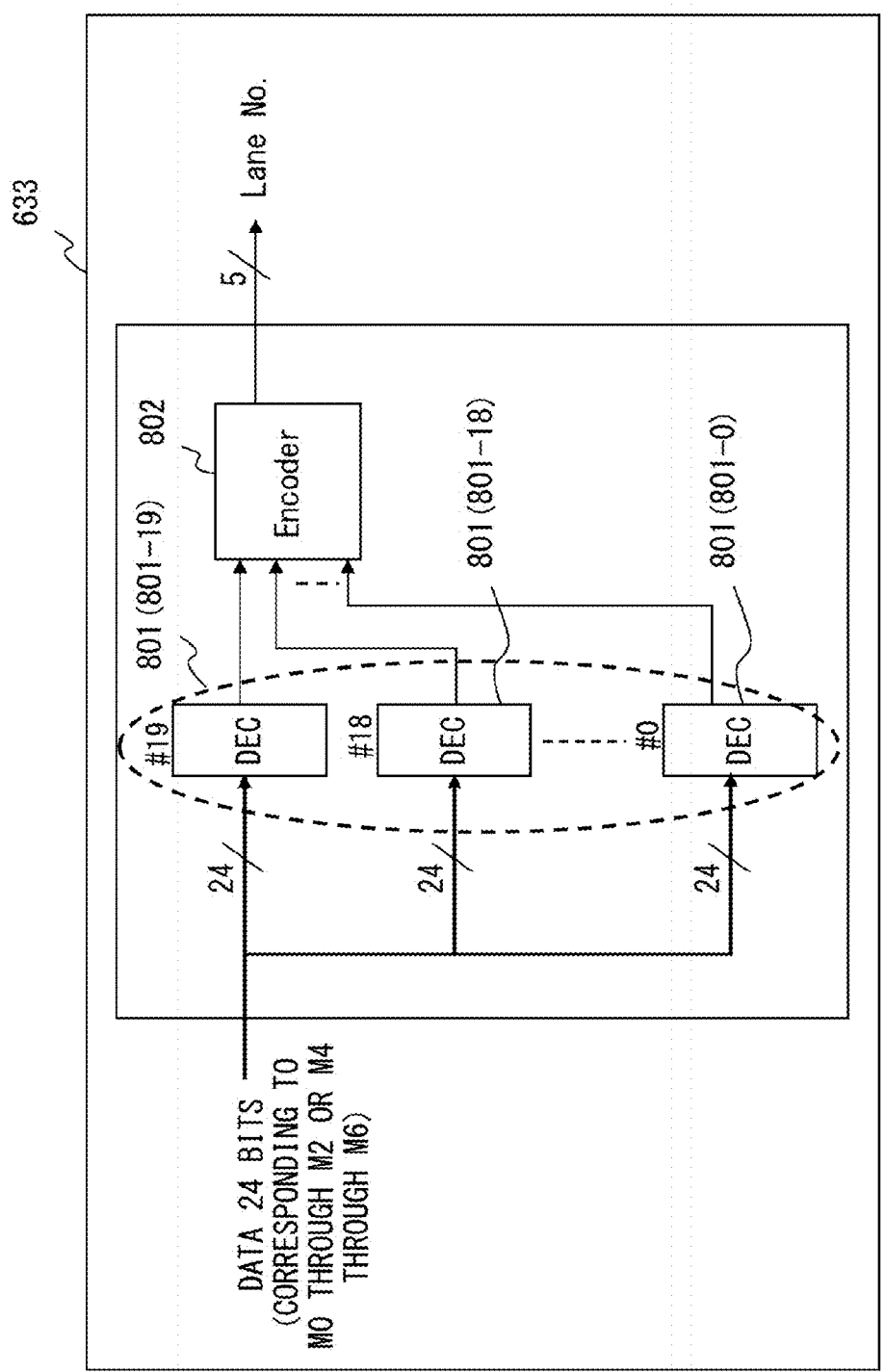
F I G. 8

DATA RECEPTION DEVICE, MARKER INFORMATION EXTRACTION METHOD, AND MARKER POSITION DETECTION METHOD

CROSS-REFERENCE TO RELATED APPLICATIONS

This application is a continuation application of International Application PCT/JP2011/059874 filed on Apr. 21, 2011 and designated the U.S., the entire contents of which are incorporated herein by reference.

FIELD

The present invention is related to the technology of transmitting data using a plurality of transmission lines.

BACKGROUND

Recently, with a larger data capacity, newly introduced broader band service represented by a video distribution, etc., a high-speed transmission is earnestly requested. As a technology to realize a high-speed transmission, a parallel transmission technology has attracted much attention. A multi-lane distribution (MLD) is one of the parallel transmission technologies.

In the MLD, a high-speed communication is realized using a plurality of lane as transmission lines. The data to be transmitted is divided into 66-bit blocks by a 64B-66B encoding process, and allocated to the respective lanes. When the number of the allocated blocks (physical coding sublayer (PCS) lanes) is larger than the number of lanes (physical lanes), a plurality of PCS lanes are bit-multiplexed for transmission on one physical lane.

In a parallel transmission using a plurality of physical lanes, askew (delay time difference) occurs between physical lanes in the data transmission. To solve the skew, a special marker specific to each PCS lane (alignment marker) is inserted for every 16,384 blocks in the MLD. On the data reception side, the alignment marker is detected for each PCS lane and the skew between the PCS lanes is corrected from the position of the detection.

The alignment marker is the information having a function of identifying a PCS lane. Inserted into each PCS lane is an alignment marker indicating the lane number as identification information assigned to the PCS lane. Thus, on the data reception side, the lane number indicated by the detected alignment marker is specified for each PCS lane, and the correct order of the block received by each PCS lane is reconstructed using the specified lane number.

A data reception device corresponding to an alignment marker has to detect an alignment marker for each PCS lane, and specify a lane number indicated by the detected alignment marker. The correspondence between the PCS lane and the physical lane may be changed. Furthermore, it is very hard to specify in advance with high accuracy the position into which the alignment marker has been inserted. Thus, the conventional data reception device detects an alignment marker and arranges a decoder for specification of a lane number for each type of alignment marker and for each phase in each PCS lane. In this specification, the phase corresponds to the part (range) in the received data which is an input of a decoder.

When data is input in a decoder in a range in which the data is bit-shifted, the number of ranges in which the data is input in the decoder is about 20. There are, for example, 20 types of alignment markers. Thus, if the number of PCS lanes is 20, the conventional data reception device are loaded with a total of 8000 (20×20×20) decoders.

When a number of decoders are loaded, the circuit scale of the data reception device and the power consumption are increased. Furthermore, the transmission path of data becomes long because data is input to a large number of decoders, thereby hardly performing a high-speed operation. Thus, it is important to minimize the number of decoders in the data reception device compatible with an alignment marker.

Some documents including Japanese Examined Patent Application Publication No. 06-28383, Japanese Patent No. 2955576, Japanese Laid-open Patent Publication No. 06-20391, etc are well known.

SUMMARY

According to an aspect of the embodiments, a data reception device which receives data transmitted through a plurality of transmission lines. The data reception device includes a position detection unit which corrects a skew of data transmitted respectively through the plurality of transmission lines, and detects the position of a marker for each lane, and an information extraction unit which extracts the identification information indicated by the marker using the result of the detection of the position of the marker by the position detection unit.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 1 is an explanatory view of the configuration of a data transmission system according to an embodiment of the present invention;

FIG. 2 is an explanatory view of the configuration of a block;

FIG. 3 is an explanatory view of a method of inserting an alignment marker;

FIG. 4A is an explanatory view of the configuration of an alignment marker;

FIG. 4B is an explanatory view of the configuration of an alignment marker;

FIG. 4C is an explanatory view of the configuration of an alignment marker;

FIG. 5 is an explanatory view of the configuration of a marker detection unit;

FIG. 8 is an explanatory view of the configuration of a PCS lane number extraction unit.

DESCRIPTION OF EMBODIMENTS

Figure 6:
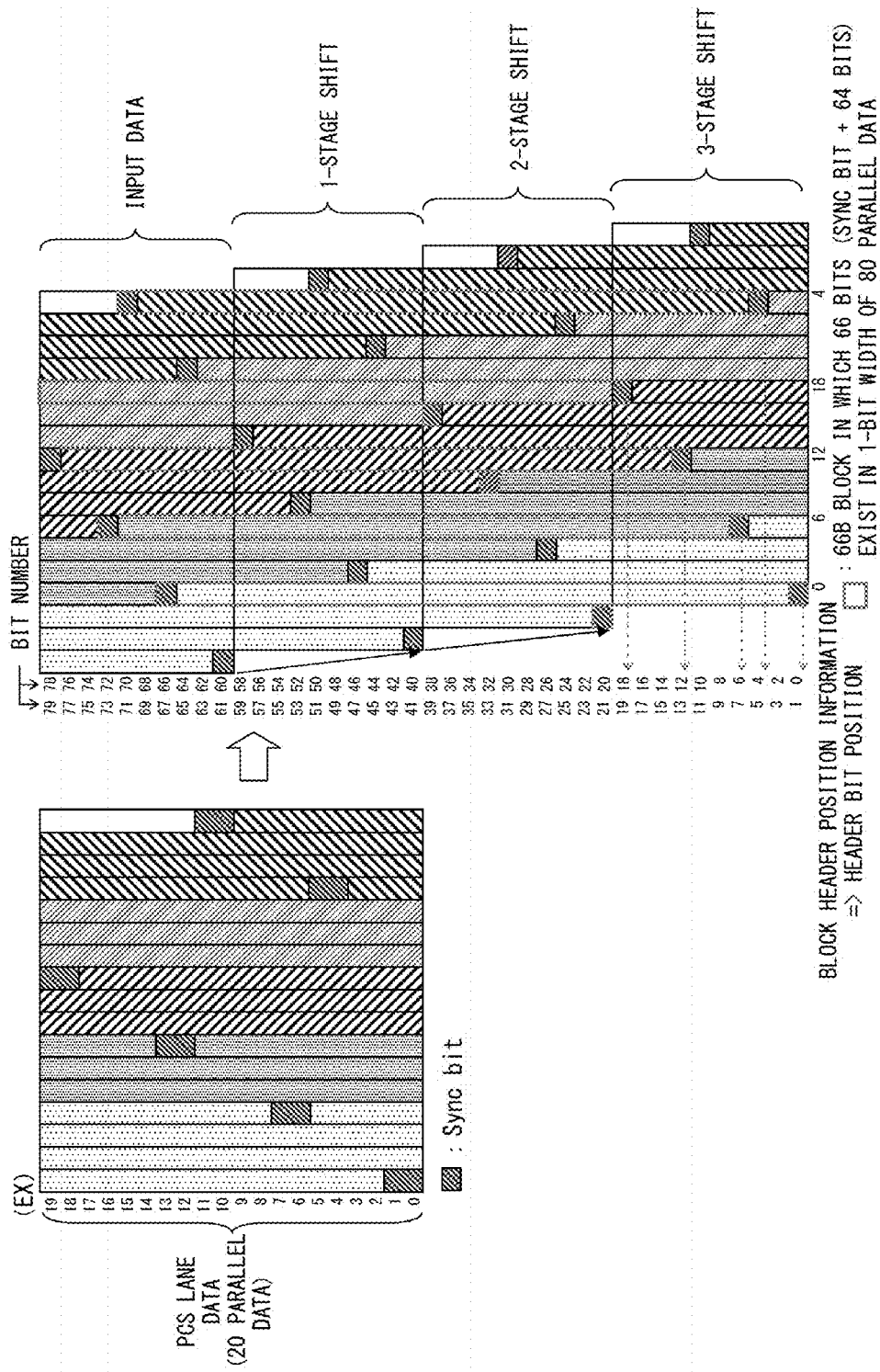
FIG. 6 is an explanatory view of the shifting operation into parallel data by a three stage shift unit.

The embodiments of the present invention are described below in detail with reference to the attached drawings.

FIG. 1 is an explanatory view of the configuration of a data transmission system according to an embodiment of the present invention. In this data transmission system, a data transmission device 2 is connected to a data reception device 3 through a plurality of transmission lines (lanes) 1.

Figure 2:
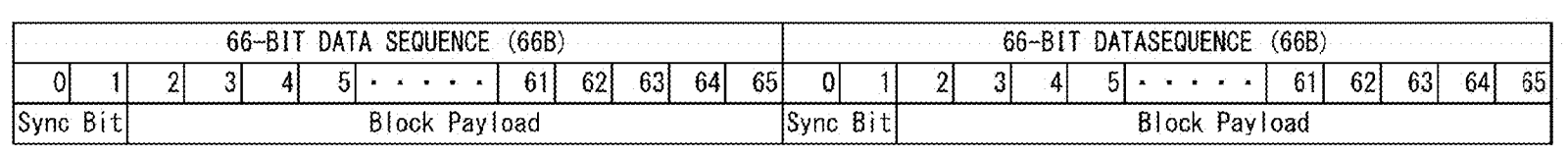

The data transmission device 2 inputs an Ether frame as data to be transmitted. The input Ether frame is divided into 64-bit blocks by a 64B-66B encoding unit 210, and each block is 64B-66B encoded. The 66-bit blocks (encoded data) obtained by the encoding are output from a 64B-66B encoding unit 210 to a multilane distribution unit 220. The blocks are 66-bit data obtained by mapping synchronous pattern (Sync Bit) in the leading 2 bits as illustrated in FIG. 2.

The multilane distribution unit 220 allocates the 66-bit blocks to the respective PCS lanes, and inserts to each specified number of blocks an alignment marker 221 as a special marker specific to the PCS lane.

FIG. 3 is an explanatory view of the method of inserting an alignment marker. FIGS. 4A through 4C are explanatory views of the configuration of the alignment marker.

As illustrated in FIG. 3, the alignment marker 221 is inserted into every 16,384 blocks in each PCS lane. The alignment marker 221 is 64-bit data including 8-bit data of M0 through M2 and M4 through M6, and 8-bit parity of BIP3 and BIP7. The contents of the data M0 through M2 and M4 through M6 are different for each PCS lane as illustrated in FIG. 4B. Thus, from the contents of the data M0 through M2 and M4 through M6, the (number of the) PCS lane may be specified. As illustrated in FIG. 4C, the contents of each piece of data M0 through M2 are obtained by inverting the contents of the data M4 through M6.

The explanation is returned to FIG. 1. There are 20 types of lane numbers 0 through 19 of the alignment marker 221 as illustrated in FIG. 4B. Thus, the multilane distribution unit 220 allocates the blocks to 20 PCS lanes. The bit multiplexing unit 230 bit-multiplexes the blocks allocated to the 20 PCS lanes depending on the number of lanes 1. Thus, if the number of lanes 1 is 10, the blocks of two PCS lanes are transmitted in each lane 1. By the bit multiplexing, the blocks of 20 PCS lanes are gathered into the number of the lanes 1. The number of lanes is 2, 4, 5, or 10.

A serializer/deserializer (SERDES) 240 performs a parallel-to-serial conversion on the bit multiplexed blocks for each lane 1, and performs a serial transmission in each lane 1.

The data reception device according to the present embodiment receives the blocks which are bit multiplexed and serially transmitted for each lane 1. The block which is bit multiplexed for each lane 1 is received by a SERDES 310, and a serial-to-parallel conversion is performed on the block and output to a bit demultiplexing unit 320. The bit demultiplexing unit 320 demultiplexes a bit multiplexed block, and outputs the block to a corresponding 66B synchronization detection unit 330 for each PCS lane.

66B synchronization detection units 330-0 through 330-19 and marker detection units 340-0 through 340-19 are prepared for each PCS lane. Each 66B synchronization detection unit 330 detects a synchronous pattern assigned to the block, and the marker detection unit 340 detects the insertion position of the alignment marker 221, and extracts a lane number indicated by the alignment marker 221. A skew correction unit 350 is notified of a result of the detection of the alignment marker 221. When the alignment marker 221 is detected, it is notified with an extracted lane number from the marker detection unit 340 to the skew correction unit 350.

The skew correction unit 350 corrects the skew between the PCS lanes from the result of the detection of the alignment marker notified by the marker detection unit 340. Furthermore, a correct order of the block of the PCS lane is reconstructed using the lane number notified by the marker detection unit 340. Thus, the block whose skew has been corrected and for which the correct order has been reconstructed in each PCS lane is output to the 64B-66B decoding unit 360. The 64B-66B decoding unit 360 recreates and outputs the original Ether frame by decoding and gathering the block of each PCS lane.

FIG. 5 is an explanatory view of the configuration of the marker detection unit.

As illustrated in FIG. 5, the marker detection unit 340 includes 20 marker position detection units 631 (631-0 through 631-19), a selector 632, a PCS lane number extraction unit 633, a register 634, an encode unit 635, and an OR gate 636. In addition, the marker detection unit 340 further includes a three stage shift unit 610 for generating data to be input to a marker detection unit, a data distribution unit 620, and a protection circuit 640 for judging a marker detection period.

The bit demultiplexing unit 320 outputs, for example, 20-bit parallel data for each parallel data. The three stage shift unit 610 inputs 20-bit parallel data, performs a 3-stage shifting operation in 20-bit units, and outputs 80-bit parallel data.

FIG. 6 is an explanatory view of the shifting operation into parallel data by a three stage shift unit. In FIG. 6, the left 20-bit parallel data is input data of the three stage shift unit 610, and the right 80-bit parallel data is output data of the three stage shift unit 610. As illustrated in FIG. 6, the 20-bit parallel data is converted into 80-bit parallel data by the 3-stage shifting operation.

The recognition of synchronization detection, that is, a synchronous pattern, is performed in the range of bit numbers 0 through 19. Since the header of the synchronous pattern may exist in any of the bit numbers 0 through 19, all of the 20 phases of the bit numbers 0 through 19 are monitored.

With the 80-bit parallel data as illustrated in FIG. 6, the entire alignment marker 221 except the synchronous pattern exists in any of the parallel data. The header exists in any of the bit numbers 0 through 19 as described above. Thus, the data distribution unit 620 shifts each bit (phase) of the data in the range in which the data M0 through M2 and M4 through M6 of the alignment marker 221 may exist, and provides he data for each marker position detection unit 631. In FIG. 5, the descriptions "(23:0)", "(56:32)", etc. in the data distribution unit 620 indicate the respective data ranges. For example, "(23:0)" indicates the total of 24-bit data in the range of the bit number 0 through the bit number 23 in the 80-bit parallel data.

Figure 7:
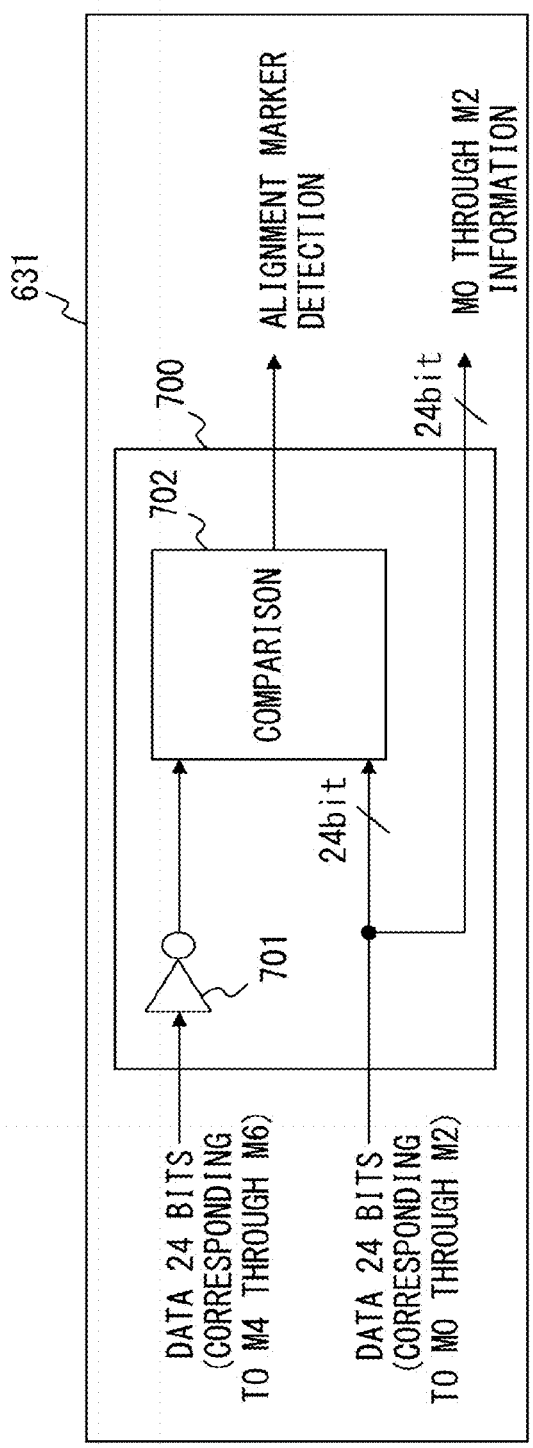
FIG. 7 is an explanatory view of the configuration of a marker position detection unit.

FIG. 7 is an explanatory view of the configuration of a marker position detection unit.

Relating to the alignment marker 221, as illustrated in FIG. 4C, the contents of the data M0 through M2 are identical to the contents obtained by inverting the contents of the data M4 through M6. With the fact considered in the present embodiment, the 24-bit data which is assumed as the data M4 through M6 is inverted by an inverter 701, and the inverted 24-bit data is compared by a comparator 702 with the 24-bit data which is assumed as the data M0 through M2. The comparator 702 outputs a signal H (high) when the two pieces of 24-bit data match each other. Therefore, the signal H output by the comparator 702 indicates that the 24-bit data is the data M0 through M2 or the data M4 through M6 as assumed above. The 24-bit data which is assumed as the data M0 through M2 is output to the selector 632. The signal output by the comparator 702 is input to the encode unit 635.

As illustrated in FIG. 6, only the 64B-66B encoding unit 210 may exist in the 80-bit parallel data. Therefore, when one alignment marker 221 exists in the 80-bit parallel data, only one marker position detection unit 631 in each marker position detection unit 631 outputs the signal H. Thus, the position in which the alignment marker 221 exists in the 80-bit parallel data may be specified by the marker position detection unit 631 which outputs the signal H.

The encode unit 635 inputs the signal output by each marker position detection unit 631, and outputs a select signal which allows the selector 632 to select the marker position detection unit 631 having the signal H depending on the signal whose level is H in the input signal. Thus, the 24-bit data (data M0 through M2) output by the marker position detection unit 631 having the signal H is input to the PCS lane number extraction unit 633 through the selector 632.

The PCS lane number extraction unit 633 includes a total of 20 decoders 801 (801-0 through 801-19) corresponding to the type of the alignment marker 221 as illustrated in FIG. 8. Each decoder 801 is provided with 24-bit data (data M0 through M2) input through the selector 632, and each decoder 801 outputs, for example, a signal H when it receives the 24-bit data corresponding to itself. The signal output by each decoder 801 is input to an encoder 802, and the encoder 802 outputs a value depending on the decoder 801 which outputs the signal H in the decoder 801 as a PCS lane number. The output lane number is input to the register 634.

In the situation in which the encoder 802 outputs a PCS lane number, any one marker position detection unit 631 outputs a signal H. Therefore, the value of the logical sum output by the OR gate 636 is 1 (H). The logical sum is provided as an enable signal which allows the register 634 to be writable. As a result, the register 634 holds the PCS lane number (5-bit data) output by the encoder. The PCS lane number held in the register 634 is output to the skew correction unit 350.

The logical sum output by the OR gate 636 is output to the skew correction unit 350 as a signal to notify whether or not the alignment marker 221 has been detected. The skew correction unit 350 recognizes the reception of the alignment marker 221 by the logical sum output by the OR gate 636, corrects the skew between the PCS lanes, and reconstructs the correct order of the blocks.

The logical sum output by the OR gate 636 is output to the protection circuit 640. The protection circuit 640 judges whether or not the detection of the alignment marker 221 has been correctly performed by monitoring the intervals of, for example, the value 1 of the input logical sum. If it judges that the detection of the alignment marker 221 is not correctly performed, the protection circuit 640 notifies an operator etc. of the information.

As described above, according to the present embodiment, the data structure of the alignment marker 221 is considered, and the comparator 702 is used in detecting the position of the alignment marker 221. The decoder 801 for extracting the PCS lane number from the alignment marker 221 observes the position detected alignment marker 221. Therefore, the decoder 801 only has to prepare the alignment marker 221 for each PCS lane, that is, a total of 20 decoders. That is, a total of 400 (20×20) in the entire data reception device 3 may be prepared. In the conventional technology in which a decoder is used in detecting a position, when data is transmitted in 20 PCS lanes, a total of 8000 (20×20×20) decoders are to be prepared. Thus, as compared with the conventional technology, the number of decoders may be 95% reduced. Furthermore, the decoders may be those which input 24-bit data, and it is not necessary to adopt a decoder which inputs 48-bit data. Thus, from the viewpoint of the circuit scale of the available decoder itself, both the size of the data reception device and the power consumption may be successfully reduced. In addition, by the reduction of the number of branches of data with the reduction of the number of the decoders, the delay of the wiring for data may be suppressed, thereby easily improving the operation speed of the data reception device.

Figure 9:
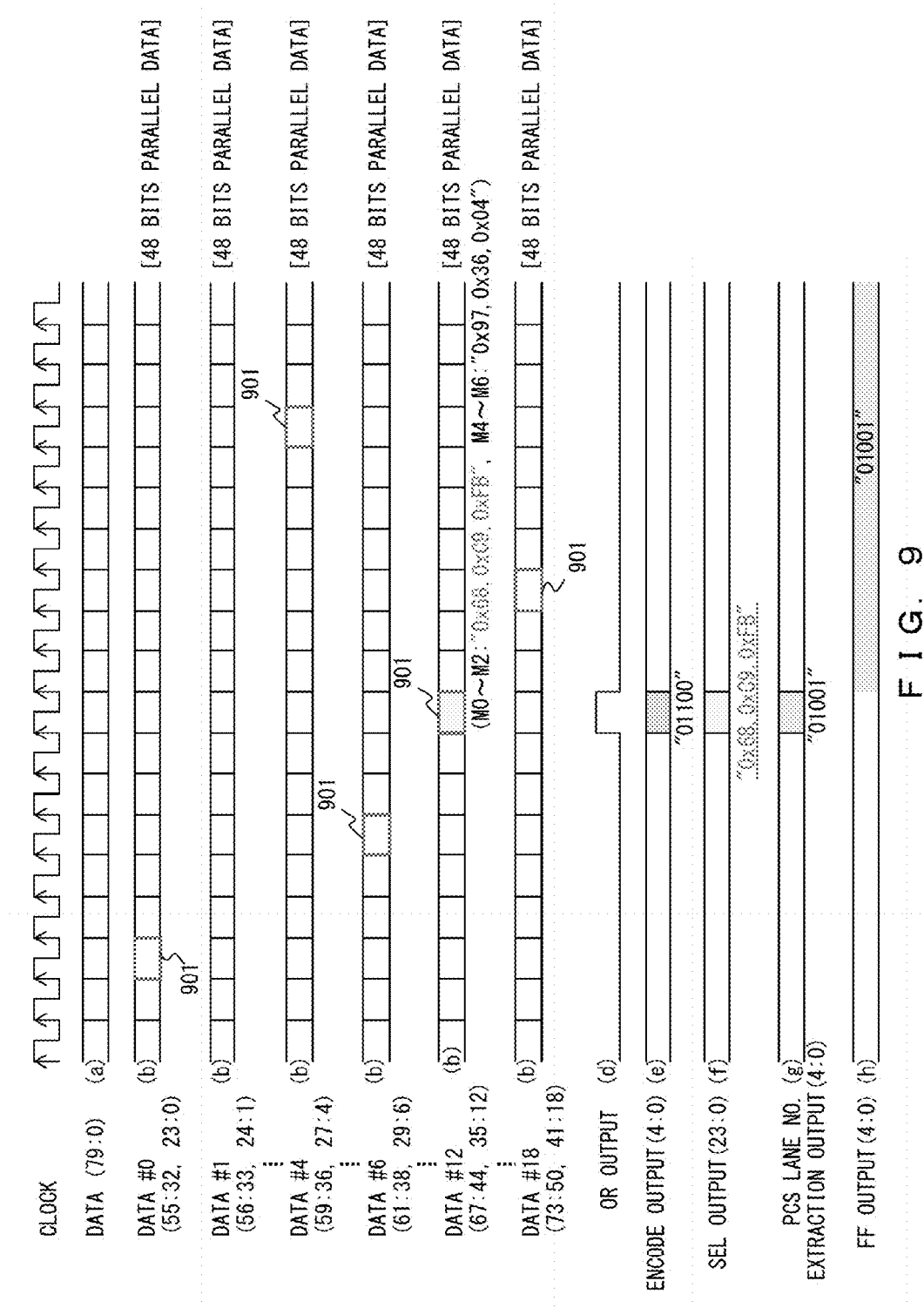
FIG. 9 is a timing chart for explanation of the operation of a marker detection unit.

FIG. 9 is a timing chart for explanation of the operation of a marker detection unit, and exemplifies the case in which 80-bit parallel data as illustrated on the right in FIG. 6 is input. In FIG. 9, (a) indicates the 80-bit parallel data output by the three stage shift unit 610, (b) indicates the position when the alignment marker 221 exists as the 48-bit data to be distributed to each marker position detection unit 631 by the data distribution unit 620, (d) indicates the logical sum output by the OR gate 636, (e) indicates the output of the encode unit 635, (f) indicates the output of the selector 632, (g) indicates the output of the encoder 802, and (h) indicates the output of the register 634. Extracted as (b) above are: data #0 having the bit numbers 0 through 23 and 32 through 55; data #1 having the bit numbers 1 through 24 and 33 through 56: data #4 having the bit numbers 4 through 27 and 36 through 59; data #6 having the bit numbers 6 through 29 and 38 through 61; data #12 having the bit numbers 12 through 35 and 44 through 67; and data #18 having the bit numbers 18 through 41 and 50 through 73. The position of the alignment marker 221 is expressed by a frame 901. (d) through (h) indicate the cases in which the alignment marker 221 has existed with the frame 901 of the data #12 placed as the header. FIG. 9 illustrates the frame 901 except the data #1, but the frame 901 practically exists in one piece of data only.

The value of the logical sum output by the OR gate 636 is 1 by the existence of the alignment marker 221, and the encode unit 635 outputs a selection signal for allowing the selector 632 to select the marker position detection unit 631 which has input the data #12. In this case, the encode unit 635 outputs the selection signal of "01100". The selector 632 outputs the 24-bit data (data M0 through M2) from the marker position detection unit 631 selected by the selection signal.

The 24-bit data is expressed as the data of "0x68" "0xC9" "0xFB" in the hexadecimal expression of the values of the 8-bit data respectively. The 24-bit data corresponds to the alignment marker 221 having the PCS lane number of 9 (FIG. 4B). Therefore, the PCS lane number extraction unit 633 outputs the data of "01001" as 5-bit data, and the register 634 holds the data output by the PCS lane number extraction unit 633 when the value of the logical sum output by the OR gate 636 turns from 1 to 0.

In the present embodiment, the position of the alignment marker is detected and the lane number is extracted for each PCS lane. However, with the configuration in which a marker such as an alignment marker is transmitted for each lane 1 the position of the marker may be detected and the identification information may be extracted for each lane 1.

The system to which the present invention is applied may detect an alignment marker by a smaller number of decoders, and extract identification information.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A data reception device which receives data transmitted through a plurality of transmission lines, the data reception device comprising:
    a plurality of marker detection circuits, each of which
        detects for each lane a position of a marker for identification of a lane which is assigned the data; and
        extracts identification information indicated by the marker for each lane using a result of the detection of the position of the marker, wherein
    each of the marker detection circuits includes
        a plurality of comparator circuits for each lane of a plurality of lanes to which the transmitted data is allocated, each of the plurality of comparator circuits receiving first data which is one of two different pieces of different partial data that is a portion of the allocated data that is different for each comparator circuit, in the received data and second data which is inverted data obtained by inverting another of the two different pieces of the different partial data, determining whether or not the first data and the second data match each other by comparing the first data and the second data, and outputting signals that indicate whether or not the first data and the second data match each other according to a result of the determination;
        a selector circuit, for each of the lanes, which selects a comparator circuit with the first data and the second data matching each other from among the plurality of comparator circuits according to the output signals; and
        a lane number extraction circuit, for each of the lanes, which receives the first data from the selected comparator circuit and extracts identification information indicated by a marker for identification of the lanes using the received first data.

2. The data reception device according to claim 1, wherein each of the marker detection circuits comprises an information detector which extracts information indicated by the marker for each lane, using the detection result of position of the marker,
    receives one of the two pieces of partial data provided for the plurality of comparator circuits which obtains a matching result in the plurality of comparator circuits for each lane, and
    extracts identification information indicated by the marker for each lane using the partial data provided.

3. A marker information extraction method used by a data reception device which receives data transmitted through a plurality of transmission lines, the marker information extraction method comprising:
    detecting for each lane a position of a marker for identification of a lane which is assigned the data; and
    extracting identification information indicated by the marker for each lane using a result of the detection of the position of the marker,
    wherein
    the information extraction method uses a plurality of comparator circuits for each lane which compare one of two pieces of different partial data in the received data with inverted data obtained by inverting the other of the two pieces of the different partial data, and provides the plurality of comparator circuits with data of different parts, thereby detecting a position of the marker by the plurality of comparator circuits which obtains a matching result in the plurality of comparator circuits.

4. A marker position extraction method used by a data reception device which receives data transmitted through a plurality of transmission lines, the marker position extraction method comprising:
    providing a plurality of comparator circuits which perform comparison as to whether or not two pieces of input data matches each other with one of two different pieces of partial data in the received data and inverted data obtained by inverting the other of the two pieces of partial data;
    and detecting for each lane a position of a marker for identification of a lane which is assigned the data.

* * * * *